June 5, 1956  F. J. FONTEIN ET AL  2,748,941
SCREEN
Filed Dec. 14, 1954

Inventors
Freerk J. Fontein and
Albert T. Basten
By Cushman, Darby & Cushman
Attorneys

United States Patent Office 2,748,941
Patented June 5, 1956

2,748,941

SCREEN

Freerk J. Fontein and Albert T. Basten, Heerlen, Netherlands, assignors to Stamicarbon N. V., Heerlen, Netherlands Application December 14, 1954, Serial No. 475,249

Claims priority, application Netherlands July 15, 1954

7 Claims. (Cl. 209—251)

This invention relates to particle separation and more particularly to an improved apparatus for separating liquid suspended particles by means of a fixed screen.

In the use of fixed screens for separating liquid suspended particles such as disclosed in copending application Serial No. 475,251 filed concurrently herewith by Freerk Fontein wherein a current of said particles is fed along the screening deck, it has been found that considerable wear occurs on the leading edges of the bars making up the screening deck. In order to prolong the life of such a screening deck it has been found advantageous to reverse the screening deck end for end so that the edges thereof that previously had been the trailing edges are made the leading edges.

Accordingly, it is an object of the present invention to provide a wet screening apparatus having means for quickly and easily reversing the screening deck end for end.

Another object of the invention is the provision of a wet screening apparatus having improved means for reversing the screening deck end for end and improved fraction collecting means arranged to receive the fractions and discharge the same from a common point in either reversed position of the screening deck.

A still further object of the present invention is the provision of a novel means for mounting a screening deck within a wet screening apparatus whereby said screening deck may be simply pivoted into two different positions wherein opposite ends thereof may be brought into proximity to the feeding means so to serve as the feed ends of the screening deck.

These and other objects of the present invention will become more apparent during the course of the following detailed description and appended claims.

The invention may best be understood with reference to the accompanying drawings wherein illustrative embodiments are shown somewhat schematically.

Figure 1:
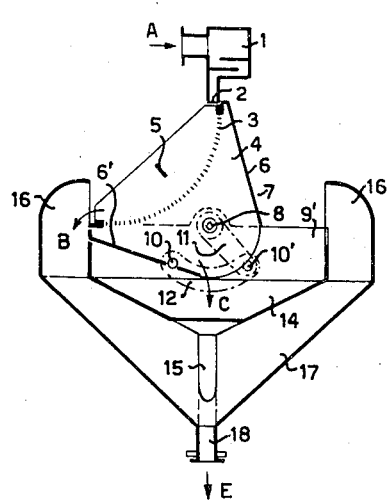
Figure 1 is a vertical sectional view of one embodiment of an apparatus constructed in accordance with the teachings of the present invention, showing the same in one of its positions of operation.
Figure 3:
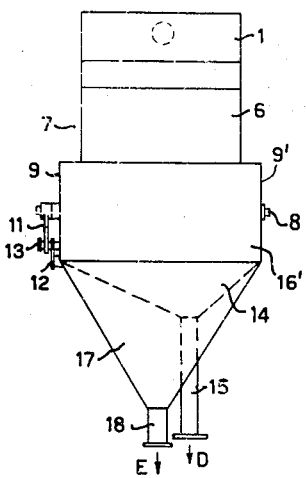
Figure 3 is a side elevational view of the apparatus shown in Figures 1 and 2.
Figure 2:
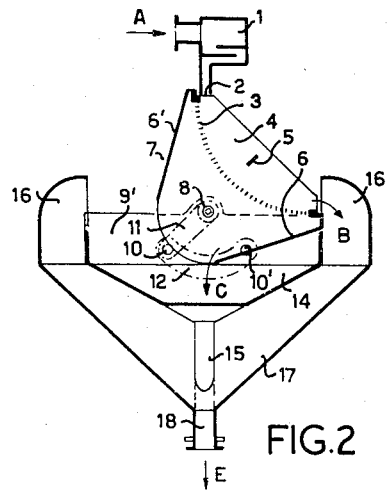
Figure 2 is a view similar to Figure 1 showing the same apparatus in a second position of operation after the reversal of the screening deck.

Referring now more particularly to Figures 1-3, a feeding means or distribution box 1 is arranged to receive a suspension entering at A and to deliver the same to a screening deck 3 along a tangential path through an exit slit 2. The screening deck 3 preferably comprises a plurality of transversely extending bars spaced apart to provide screening slits therebetween and arranged symmetrically in the shape of a partial cylinder. The bars are preferably mounted between a pair of plates 4 which together with suitable reinforcement ridges 5 and draining plates 6 and 6' constitute a box 7. The box 7 is mounted on a horizontal shaft 8 which is pivoted between a pair of vertical walls 9 and 9' of a central collecting trough or tank 14. The shaft 8 is disposed in the plane along which the feed is supplied, just below the slit 2. Mounted on the shaft 8 is a lever 11 which coacts with a segment 12 mounted on wall 9. The segment 12 includes two holes 10 and 10' within which a pin 13 carried by the lever can be alternately inserted so that the box 7 can be locked in the two operating positions shown in Figures 1 and 2. In both operating positions the undersize C flows between the draining plates 6 and 6' to a central collecting trough or tank 14 from where it is carried off at D by means of a pipe 15.

With the screening deck in the position shown in Figure 1, the oversize fraction B issuing tangentially from the discharge end of the screening deck is received in one portion 16 of a collecting trough or vessel 17. After the screen has been placed in the position shown in Figure 2, the oversize fraction is delivered into a second portion 16' of the collecting trough 17. The portions 16 and 16' are arranged on either side of the central collecting tank 14. As shown, the two portions are spaced below and on each side of the feeding means slit 2 so that the discharge end of the screening deck will be disposed in proximity to either one or the other of the portions depending on the position of operation. In either position, the oversize fraction flows through the common collecting trough or vessel 17, towards a discharge pipe 18 by which it is carried off at E.

Figure 4:
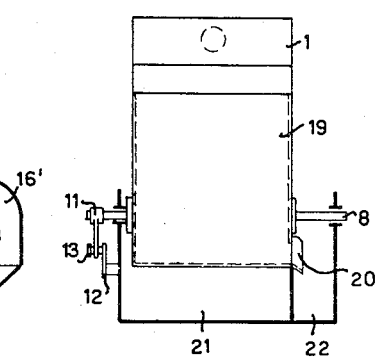
Figure 4 is a view similar to Figure 3 showing a modified form of an apparatus embodying the present invention.

Figure 4 shows an apparatus having a modified form of the means for separately collecting and discharging the fractions A. Box 19 in which the screening deck 3 has been mounted is provided on one side with a spout 20 and is closed at the bottom by connecting the draining plates 6 and 6' together. In this construction the collecting means for the oversize fraction preferably comprises a trough 21 situtated under the box 19 which includes portions extending on either side of the plane along which the feed is supplied. Transversely adjacent the trough 21 there is a collecting tank 22, into which the spout 20 discharges. The undersize fraction is always delivered at the same spot into the collecting tank 22, whereas the oversize fraction, which is collected in the trough 21 is alternately delivered before and behind the plane of the drawing.

It can then be seen that the present invention provides an apparatus whose screening deck can be reversed in a simple manner. Accordingly, the screening deck is installed in a box which can be readily turned or tipped about its pivotal axis so that in one position one end of the screening deck connects to the feed means, while in the other position the opposite end of the screening deck connects to said feed means. The lever and segment arrangement provides a convenient means for moving the box into its operative positions and for maintaining it therein. It will be understood, however, that other means may be provided. The collecting means for the oversize fraction extends on either side of the plane along which the feed is delivered so as to connect with the discharge end of the screening deck in either operating position.

According to one preferred mode of construction the apparatus is provided with a central collecting tank for the undersize, while on either side thereof means are arranged for collecting the oversize, which collecting means may open, if so desired, into a common collecting reservoir. According to another mode of construction, the collecting means for the oversize fraction consist of a trough disposed under the box in which case the collecting means for the undersize is arranged beside said trough, It is to be understood that the terminology employed herein is for purposes of description and not limitation. The term "cylindrical" is herein used in its mathematical sense. It is also to be understood that the form of the invention herewith shown and described is to be taken as the preferred embodiment of the same, and that various changes may be made without departing from the spirit of the invention or the scope of the appended claims.

We claim:

1. Apparatus for wet screening comprising a non-continuous cylindrically curved screening deck, means for feeding liquid and a mixture of particles to be separated along a tangential path to the concave side of said screening deck, means disposed on the convex side of said screening deck for collecting an undersize fraction of said particles, and means for collecting an oversize fraction issuing tangentially from the discharge end of said screening deck, said screening deck being mounted for movement between a first position wherein one end thereof serves as a feed end and a second position wherein the opposite end serves as a feed end, said overflow fraction collecting means including portions spaced on opposite sides of the plane of path of tangential feed to the screening deck, each of said portions being arranged to receive the overflow fraction issuing from said screening deck in one of said positions.

2. Apparatus as defined in claim 1 wherein said screening deck is pivotally mounted for movement between said positions.

3. Apparatus as defined in claim 1 wherein means is provided for holding said screening deck in said positions.

4. Apparatus as defined in claim 1 wherein said overflow and undersize fraction collecting means comprise adjacent troughs.

5. Apparatus as defined in claim 4 wherein the undersize fraction collecting trough is disposed between said spaced portions of said oversize fraction collecting trough.

6. Apparatus as defined in claim 4 wherein the undersize fraction collecting trough is disposed transversely alongside of the oversize fraction collecting trough.

7. Apparatus for wet screening comprising a non-continuous screening deck including a plurality of symmetrically arranged bars spaced apart so as to form a plurality of slits therebetween, feeding means for delivering a current of liquid suspended particles to one end of said screening deck for travel along one surface thereof in a direction substantially perpendicular to said bars, means disposed on the opposite surface of said screening deck for collecting an undersize fraction of said particles passing through said slits and means for collecting an overflow fraction issuing from the opposite end of said screening deck, said screening deck being mounted for movement between a first position wherein one end thereof serves as a feed end and a second position wherein the opposite end serves as a feed end, said overflow fraction collecting means including portions spaced on opposite sides of said feeding means below the latter, each of said portions being arranged to receive the overflow fraction issuing from said screening deck in one of said positions.

No references cited.